United States Patent
Sung et al.

(10) Patent No.: US 9,780,860 B1
(45) Date of Patent: Oct. 3, 2017

(54) SYSTEMS AND METHODS FOR CONTROLLING A REFERENCE SIGNAL MODE TO FACILITATE BEAMFORMING

(71) Applicant: Sprint Spectrum LP, Overland Park, KS (US)

(72) Inventors: Sanghoon Sung, Ashburn, VA (US); Yun Sung Kim, Ashburn, VA (US); Pinalkumari Tailor, Ashburn, VA (US); Won H. An, Fairfax, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 92 days.

(21) Appl. No.: 14/529,289

(22) Filed: Oct. 31, 2014

(51) Int. Cl.
*H04B 7/06* (2006.01)
*H04W 16/08* (2009.01)

(52) U.S. Cl.
CPC ......... *H04B 7/0632* (2013.01); *H04B 7/0617* (2013.01); *H04W 16/08* (2013.01)

(58) Field of Classification Search
CPC .................................................... H04W 16/08
See application file for complete search history.

(56) References Cited

U.S. PATENT DOCUMENTS

| | | | |
|---|---|---|---|
| 8,633,855 B2 | 1/2014 | Lee et al. | |
| 2007/0223423 A1* | 9/2007 | Kim | H04B 7/0417 370/334 |
| 2012/0076024 A1* | 3/2012 | Ko | H04B 7/0486 370/252 |
| 2012/0113967 A1 | 5/2012 | Smith et al. | |
| 2012/0218968 A1* | 8/2012 | Kim | H04B 7/024 370/329 |
| 2013/0229989 A1* | 9/2013 | Natarajan | H04W 72/042 370/329 |
| 2013/0286863 A1* | 10/2013 | Silverman | H04L 5/001 370/252 |
| 2013/0322363 A1 | 12/2013 | Chen et al. | |
| 2015/0043520 A1* | 2/2015 | Sun | H04L 5/001 370/330 |

OTHER PUBLICATIONS

Sounding Reference Signal, MATLAB & Simulink, p. 1-4.
LTE Quick Reference-Beam Forming, http://www.sharetechnote.com/html/Handbook_LTE_BeamForming.html, p. 1-9, Aug. 3, 2014.
LTE Transmission Modes and Beamforming, MIMO and Beamforming Technologies, Rohde & Schwarz, p. 1-24, May 2014.

* cited by examiner

*Primary Examiner* — Mohammad Anwar
*Assistant Examiner* — Angel Brockman

(57) ABSTRACT

Systems and methods are described for controlling a reference signal mode to facilitate beamforming. A load amount for reference signals from one or more wireless devices in communication with an access node is determined and compared with load level criteria. When the load amount meets or exceeds the load level criteria, the one or more wireless devices are directed to transmit reference signals using a subband mode of transmission. A subband quality is determined for a plurality of subbands available for the one or more wireless devices and a subband for reference signal transmission is selected from the plurality of subbands based on channel quality criteria. Wireless transmission, such as from an access node, to the one or more wireless devices is scheduled utilizing beamforming based on the reference signal.

18 Claims, 7 Drawing Sheets

SYSTEMS AND METHODS FOR CONTROLLING A REFERENCE SIGNAL MODE TO FACILITATE BEAMFORMING

TECHNICAL BACKGROUND

Telecommunication systems, such as cellular networks or other wireless networks, use various network links throughout the network to communicate. For example, an access node may use a network link to communicate with another access node while using a separate network link to communicate with another processing node. Accordingly, the system may rely on a well-established network to provide efficient communication services.

In certain circumstances, a portion of the network may experience high load of reference signals transmitted between one or more wireless devices and the portion of the network. Because resources for the reference signals are limited, the high load of reference signals may lead to delays in scheduling the reference signals, which may diminish the efficiency of the system. Accordingly, a system that effectively balances the load of reference signals may be able to provide a high quality service to users of the system.

Overview

Systems and methods are described for controlling a reference signal mode to facilitate beamforming. A load amount for reference signals from one or more wireless devices in communication with an access node is determined and compared with load level criteria. When the load amount meets or exceeds the load level criteria, the one or more wireless devices are directed to transmit reference signals using a subband mode of transmission. A subband quality is determined for a plurality of subbands available for the one or more wireless devices and a subband for reference signal transmission is selected from the plurality of subbands based on channel quality criteria. Wireless transmission, such as from an access node, to the one or more wireless devices is scheduled utilizing beamforming based on the reference signal.

DETAILED DESCRIPTION

Figure 1:
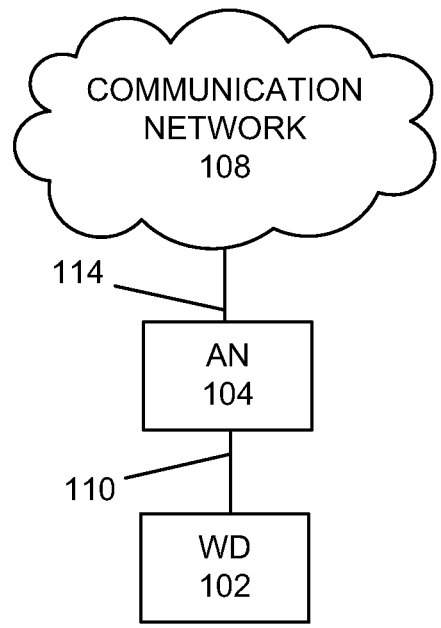
FIG. 1 illustrates an exemplary communication system to perform beamforming at an access node.

FIG. 1 illustrates an exemplary communication system 100 for a procedure to control a reference signal transmission mode to facilitate beamforming in a wireless communication network. According to an exemplary embodiment, communication system 100 comprises a wireless device 102, access node 104, and communication network 108. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access node 104 and communication network 108 that are omitted for clarity, including additional processing nodes, routers, gateways, and physical and/or wireless data links for carrying data among the various network elements.

Wireless device 102 can be any device configured to communicate over system 100 using a wireless communication link. For example, wireless device 102 can include a cell phone, a smart phone, a computing platform such as a laptop, palmtop, or a tablet, a personal digital assistant, or an internet access device, and combinations thereof. It is noted that while one wireless device is illustrated in the exemplary embodiment of FIG. 1 as being in communication with access node 104, any number of wireless devices can be implemented according to the various exemplary embodiments disclosed herein.

Wireless device 102 can transmit and/or receive information over system 100 using various communication services. These services can include various voice, data, and/or MBMS services and applications. Such services may include, for example, mobile voice services, mobile data services, push-to-talk services, internet services, web browsing, email, pictures, picture messaging, video, video messaging, broadcast video, audio, voicemail, music MP3's, ring tones, stock tickers, new alerts, etc.

Access node 104 can be any network node configured to provide communication between wireless device 102 and communication network 108. Access node 104 can be a short range access node or a standard access node. According to an exemplary embodiment, a short range access node could include a microcell base station, a picocell base station, a femtocell base station, or the like and a standard access node could include a base transceiver station, a radio base station, an eNodeB device, or an enhanced eNodeB device, or the like. It is noted that while one access node 104 is illustrated in the exemplary embodiment of FIG. 1, any number of access nodes can be implemented within system 100.

Communication network 108 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet), according to an exemplary embodiment.

Communication network 108 can be capable of carrying data, for example, to support voice, push-to-talk, broadcast video, and data communications by a wireless device, such as wireless device 102. Wireless network protocols can comprise, for example, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 108 comprise, for example, Ethernet, Fast Ethernet, Gigabit Ethernet, Local Talk (such as Carrier Sense multiple Access with Collision Avoidance), Token Ring, Fiber Distributed Data Interface (FDDI), and Asynchronous Transfer Mode (ATM). According to an exemplary embodiment, communication network 108 can also comprise additional base stations, controller nodes, telephony switches, internet routers, network gateways, computer systems, communication links, or other types of communication equipment, and combinations thereof.

Communication links 110, 114 can be wired or wireless and use various communication protocols such as, for example, Internet, Internet protocol (IP), local-area network (LAN), optical networking, hybrid fiber coax (HFC), telephony, T1, or some other communication format, including combinations, improvements, or variations thereof. According to an exemplary embodiment, wireless communication links can be, for example, a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used than those specified in the various exemplary embodiments described herein. Links 110, 114 can be a direct link or may include various equipment, intermediate components, systems, and networks, according to an exemplary embodiment.

Figure 2:
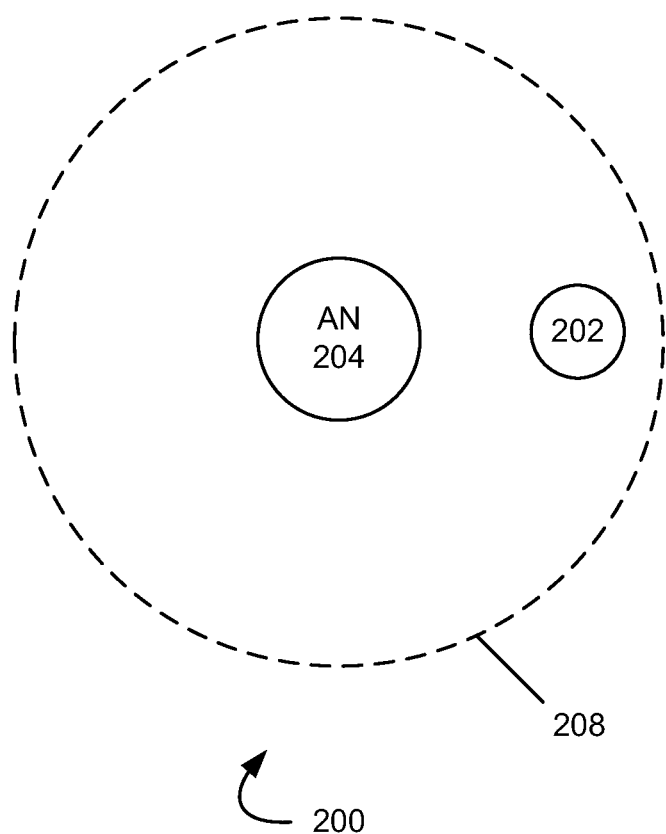
FIG. 2 illustrates an exemplary communication system that does not perform beamforming.
Figure 3:
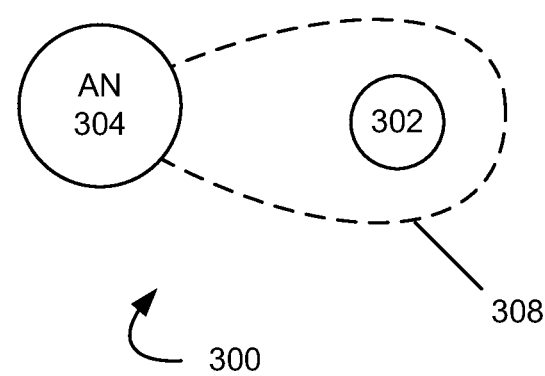
FIG. 3 illustrates an exemplary communication system that performs beamforming.

FIGS. 2 and 3 illustrate exemplary systems 200, 300 for communicating between access nodes and wireless devices. According to an exemplary embodiment, system 200, 300 respectively comprise a wireless device 202, 302; an access node 204, 304; and signal areas 208, 308. Wireless devices 202 and 302 may each comprise a device similar to wireless device 102 of the exemplary embodiment of FIG. 1. Access nodes 204 and 304 may each comprise an access node similar to access node 104 of the exemplary embodiment of FIG. 1.

Systems 200, 300 may use a plurality of carriers to provide wireless communication services, according to an exemplary embodiment. A plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may be further divided into subcarriers. According to an exemplary embodiment, a frequency band may comprise a carrier, a channel, a subcarrier, a plurality of any of these, or any other suitable frequency band.

According to an exemplary embodiment, access node 204 may establish communication with wireless device 202 such that access node 204 provides wireless device 202 access to a communication network (e.g., communication network 108 of the exemplary embodiment of FIG. 1). Signal area 208 may comprise an area around access node 204 where a wireless device may detect wireless signals transmitted from access node 204 at a signal level above a threshold. For example, signal area 208 may comprise a coverage area for access node 204, such that wireless devices (e.g., wireless device 202) that fall within signal area 208 are provided wireless resources by access node 204.

Services provided to a wireless device via an access node may vary in quality as a result of various factors. For example, wireless device 202 in the exemplary embodiment of FIG. 2 may be located at an edge of signal area 208. Accordingly, wireless device 202 may have a low channel quality (e.g., have a channel quality indicator (CQI) below a predetermined threshold or criteria). The low channel quality may be based on a high interference level for the signals received by wireless device 202, or other suitable factors.

To address low channel quality, a communication system may utilize beamforming to enhance wireless services provided to the wireless device. Turning to the exemplary embodiment of FIG. 3, access node 304 may perform beamforming such that a signal transmitted to wireless device 302 is adjusted based on the location of wireless device 302. For example, an adjusted beam 308 may be transmitted from access node 304 such that wireless device 302 may experience greater channel quality when communicating with access node 304. According to an exemplary embodiment, the adjusted beam 308 may comprise of signals transmitted over a frequency band assigned to wireless device 302 (e.g., assigned as the frequency band that access node 304 uses to communicate with wireless device 302).

According to an exemplary embodiment, beamforming may be accomplished using a plurality of antennas at access node 304 that implement, for example, a multiple input multiple output (MIMO) protocol. The signals from each of the plurality of antennas may be controlled such that the net signal from the access node may be transmitted towards wireless device 302 as a beamformed signal. According to an exemplary embodiment, the beam may be formed by weighting the magnitude and/or phase of the signals transmitted by each individual antenna at access node 304. For example, the signals may be weighted such that the emitted waveform from the antennas experiences constructive interference in the direction of wireless device 302 and destructive interference in other directions (e.g., away from wireless device 302). System 300 is depicted in the exemplary embodiment of FIG. 3 with access node 304 adjusting beams emitted by access node 304 toward wireless device 302. Adjusted signal beams 308 may be narrowed, for example, towards the location of wireless device 302. In another example, the signals may be weighted such that the emitted waveform from the antennas experiences destructive interference in the direction of wireless device 302, such as, for example, to beamform in directions away from wireless device 302 so the adjusted signal beam is not transmitted towards the location of wireless device 302. According to an exemplary embodiment, the adjusted beams 308 may comprise signals transmitted over a frequency band assigned to wireless device 302 (e.g., assigned as the frequency band that access node 304 uses to communicate with wireless device 302).

Figure 4:
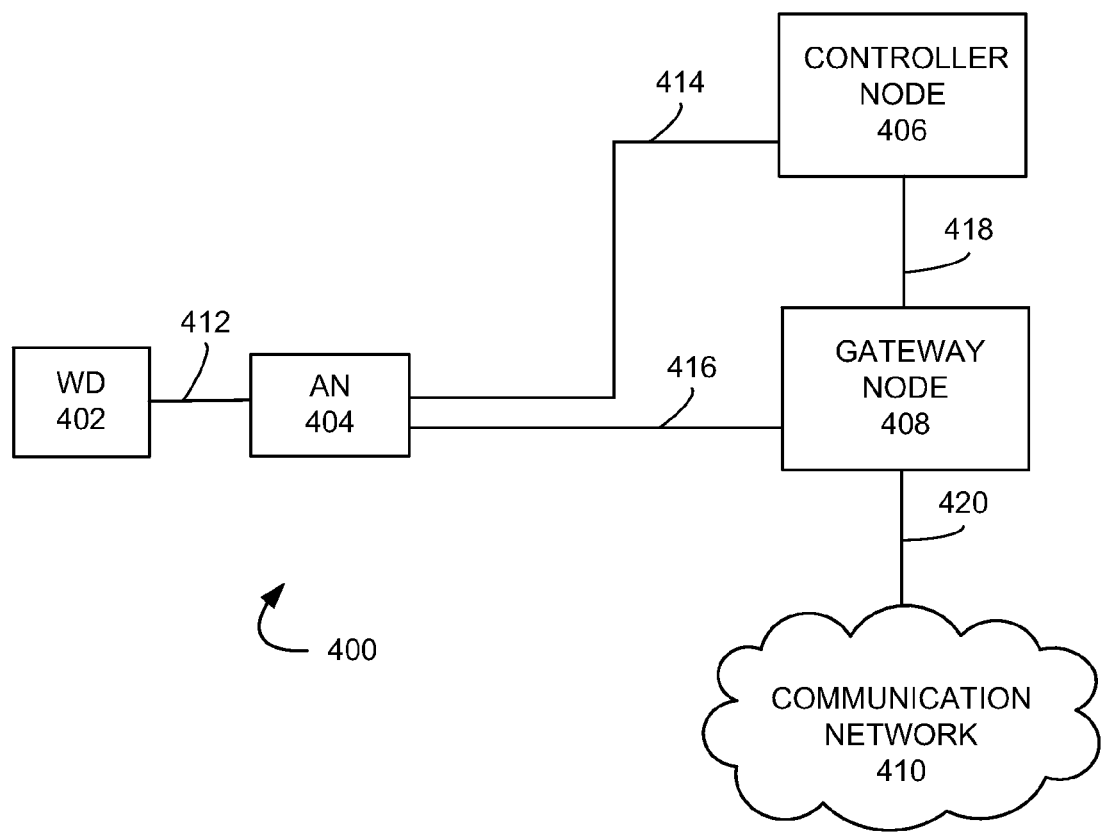
FIG. 4 illustrates another exemplary method of performing beamforming at multiple access nodes.

FIG. 4 illustrates another exemplary communication system 400 to perform beamforming at an access node. Communication system 400 may comprise wireless device 402, access node 404, controller node 406, gateway node 408, communication network 410, and communication links 412, 414, 416, 418, and 420. Other network elements may be present in communication system 400 to facilitate communication but are omitted for clarity, such as base stations, base station controllers, gateways, mobile switching centers, dispatch application processors, and location registers such as a home location register or visitor location register.

Wireless device 402 can be any device configured to communicate over communication system 400 using a wireless communication link. For example, wireless device 402 can include a cell phone, a smart phone, a computing platform such as a laptop, palmtop, or a tablet, a personal digital assistant, or an internet access device, and combinations thereof. Although a single wireless device 402 is depicted in the exemplary embodiment of FIG. 4, other numbers of wireless devices may be used in communication system 400.

Access node 404 is a network node capable of providing wireless communications to wireless device 402, and can be, for example, a base transceiver station, a radio base station, or an eNodeB device. According to an exemplary embodiment, access node 404 can comprise a serving access node for wireless device 402. Access node 404 may communicate with controller node 406 over communication link 414 and with gateway node 408 over communication link 416. When communication system 400 includes a plurality of access nodes (not shown in the exemplary embodiment of FIG. 4), the access nodes may communicate directly with each other over communication links (not shown in FIG. 4) linking the various access nodes to one another.

Controller node 406 can be any network node configured to manage services within system 400. Controller node 406 may provide other control and management functions for system 400. Controller node 406 can be a single device having various functions or a plurality of devices having differing functions, according to an exemplary embodiment. For example, controller node 406 can include at least one of a multi-cell/multicast coordination entity (MCE), a mobility management entity (MME), a radio network controller (RNC), a mobile switching center (MSC), and combinations thereof.

According to an exemplary embodiment, controller node 406 can comprise a processor and associated circuitry to execute or direct the execution of computer-readable instructions to obtain information. Controller node 406 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 406 can receive instructions and other input at a user interface, according to an exemplary embodiment. Controller node 406 can comprise a processor and associated circuitry to execute or direct the execution of computer-readable instructions to obtain information.

Gateway node 408 is a network element that can comprise a processor and associated circuitry to execute or direct the execution of computer-readable instructions, according to an exemplary embodiment. Gateway node 408 may retrieve and execute software from storage. Storage may include, for example, a disk drive, flash drive, memory circuitry, or some other memory device, that can be local or remotely accessible. According to an exemplary embodiment, the software comprises computer programs, firmware, or some other form of machine-readable instructions, and may include an operating system, utilities, drivers, network interfaces, applications, or some other type of software, including combinations thereof. According to an exemplary embodiment, gateway node 408 can provide to access nodes of system 400 (e.g., access node 404) instructions related to channel selection for communications with wireless devices (e.g., wireless device 402). For example, gateway node 408 can comprise at least one of a serving gateway (SGW), a packet data network gateway (PDNGW), a cellular gateway (CGW), and combinations thereof.

Communication network 410 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet), according to an exemplary embodiment. Communication network 410 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 410 comprise, for example, Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 412, 414, 416, 418, and 420 can be wired or wireless communication links, according to an exemplary embodiment. Wired communication links can be, for example, twisted pair cable, coaxial cable or fiber optic cable, or combinations thereof. Wireless communication links can be, for example, a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Other wireless protocols can also be used.

Other network elements may be present in the communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access node 404, controller node 406, gateway node 408, and communication network 410 that are omitted for clarity, including, for example, additional processing nodes, routers, gateways, and physical and/or wireless data links for carrying data among the various network elements. In an embodiment, any of controller node 406, gateway node 408, and one or more modules of the access node(s) (e.g., access node 404) may perform all or parts of the methods of FIGS. 3 and 7, as illustrated in the various exemplary embodiments described herein.

In operation, access node 404 may establish communication with wireless device 402 such that access node 404 provides wireless device 402 access to a communication network (e.g., communication network 410). According to an exemplary embodiment, system 400 may use a plurality of carriers in order to provide wireless communication services. A plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. According to an exemplary embodiment, a frequency band may comprise a carrier, a channel, a subcarrier, a plurality of any of these, or any other suitable frequency band.

According to an exemplary embodiment, system 400 may leverage beamforming to enhance the wireless services provided to wireless device 402. For example, wireless device 402 may be located at the edge of a signal area for access node 404, as described above with regard to the exemplary embodiments of FIGS. 2 and 3. Accordingly, wireless device 402 may have a low channel quality (e.g., a channel quality indicator (CQI) is below a predetermined threshold or criteria). The low channel quality may be based on a high interference level for the signals received by wireless device 402, or other suitable factors. In an embodiment, access node 404 may perform beamforming such that a signal transmitted to wireless device 402 is adjusted based on the location of the wireless device, as discussed above with regard to the exemplary embodiment of FIG. 3. For example, an adjusted beam (e.g., adjusted beam 308 of FIG. 3) may be transmitted from access node 404 such that wireless device 402 may experience greater channel quality when communicating with access node 404. According to an exemplary embodiment, the adjusted beam may comprise signals transmitted over a frequency band assigned to wireless device 402 (e.g., assigned as the frequency band that access node 404 uses to communicate with wireless device 402).

According to an exemplary embodiment, the beamforming may be accomplished using a plurality of antennas at access node 404 that implement, for example, a multiple input multiple output (MIMO) protocol. The signals from each of the plurality of antennas may be controlled such that the net signal from access node 404 may be transmitted towards wireless device 402 as a beamformed signal. In an embodiment, the beam may be formed by weighting the magnitude and/or phase of the signals transmitted by each individual antenna. For example, the signals may be weighted such that the emitted waveform from the antennas experiences constructive interference in the direction of wireless device 402 and destructive interference in other directions (e.g., away from wireless device 402). In another example, the signals may be weighted such that the emitted waveform from the antennas experiences destructive interference in the direction of wireless device 402.

The various exemplary embodiments described herein contemplate methods and systems to control a transmission method for reference signals in order to manage a reference signal load amount and facilitate beamforming. For instance, one method to determine the weighting for beamforming signals uses reference signals for channel estimation. According to an exemplary embodiment, channel estimation is performing by sending a reference signal between a wireless device and an access node. The weighting used for beamforming signals is derived on the basis of the channel estimation. According to an exemplary embodiment, the reference signal may be a reference signal transmitted from the wireless device to the access node. For example, the reference signal may be an uplink reference signal (e.g., a sounding reference signal (SRS)) transmitted from the wireless device to the access node. According to an exemplary embodiment, a communication system including the access node and the wireless device utilizes time division duplexing (TDD), which uses the same frequency for both the uplink and downlink channels. As a result, the uplink reference signal may be used to estimate the channel, which in turn can be used to derive the weighting used for downlink beamforming.

Figure 5:
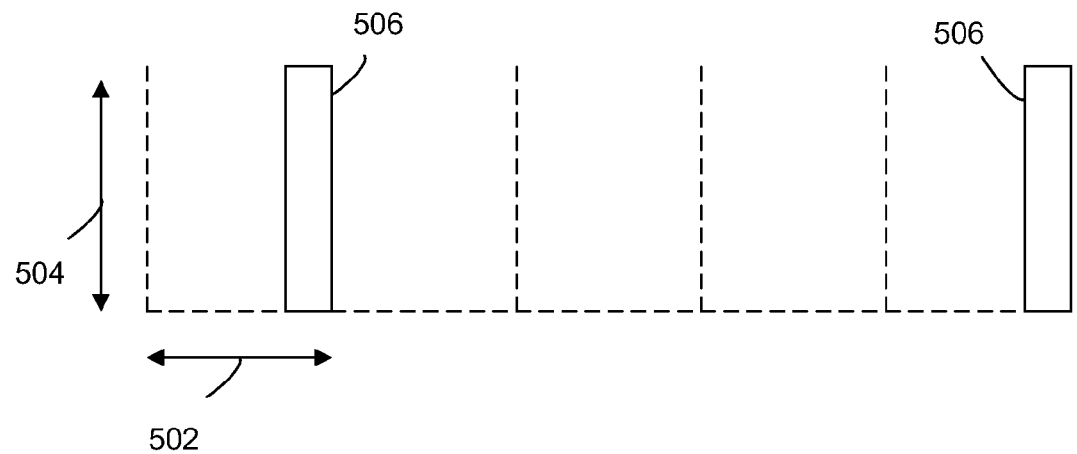
FIG. 5 schematically illustrates an exemplary method of transmitting reference signals using a wideband transmission method.

One mode for transmitting reference signals is via wideband transmission, such as, for example, wideband SRS. Turning to FIG. 5, an exemplary embodiment of wideband reference signal transmission is depicted in which a single reference signal transmission 506 is transmitted in a subframe 502, a division of time used to allot resources (e.g., over the air resources) for transmissions between a wireless device and an access node, depicted along the horizontal axis in the exemplary embodiment of FIG. 5, with the reference signal transmission 506 spanning the entire bandwidth of interest 504. A communication system may analyze the reference signal 506 to determine channel quality and estimate a channel for beamforming. According to an exemplary embodiment, the communication system may analyze the reference signal and assign channel quality ratings to various channels corresponding to the reference signal according to a channel quality index (e.g., channel quality indicator (CQI)) to facilitate the selection of one of the channels.

A reference signal transmission 506 that spans the entire bandwidth permits a communication system to analyze various channels across the available bandwidth 504 with a single transmission 506. However, because the reference signal covers the entire bandwidth 504, only one reference signal may be transmitted to an access node within a single subframe 502. As a result, resources (e.g., the number of subbands 502) for transmitting reference signals are limited, which may lead to delays in transmission of reference signals and scheduling of beamforming. As a result, a system using only a wideband mode of transmitting reference signals may become less efficient under certain reference signal load conditions.

Figure 6:
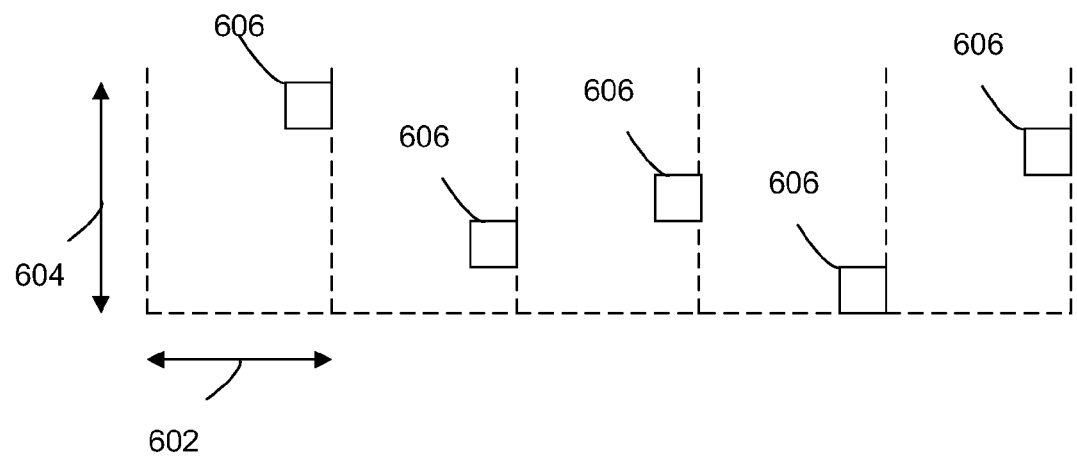
FIG. 6 schematically illustrates an exemplary method of transmitting reference signals using a subband transmission method.

FIG. 6 depicts an exemplary embodiment of subband reference signal transmission (e.g., subband SRS) in which a reference signal transmission 606 uses only a portion of the available bandwidth 604 within a subframe 602. According to an exemplary embodiment, a communication system may analyze the subband reference signals and assign channel quality ratings to various channels corresponding to the subband reference signals according to a channel quality index (e.g., Channel Quality Indicator (CQI)) to facilitate the selection of one of the channels. Because each subband reference signal 606 uses only a portion of the available bandwidth 604 within a subframe 602, various subband reference signals 606 may be transmitted over different frequencies from different wireless devices within a particular subband.

As shown in the exemplary embodiment of FIG. 6, multiple subband reference signals 606 may be transmitted over a plurality of subframes 602 so that the subband reference signals 606 collectively cover the available bandwidth 604. The various exemplary embodiments described herein may utilize the subband mode of reference signal transmission depicted in the exemplary embodiment of FIG. 6 but are not limited to this type of subband reference signal transmission. According to an exemplary embodiment, one or more subband reference signals 606 may be transmitted for a particular wireless device/access node pair so that the one or more subband reference signals 606 collectively correspond to less than the available bandwidth 604. For example, the one or more subband reference signals 606 may be selected on the basis of historical data for the access node (e.g., subbands corresponding to channels having good quality ratings, as determined from previous reference signals). In another example, the one or more subband reference signals 606 may be selected according to an algorithm that considers various factors affecting channel quality.

The various exemplary embodiments described herein contemplate methods and systems in which a transmission mode for reference signals is controlled to facilitate beamforming. According to an exemplary embodiment, a load amount for reference signals from one or more wireless devices in communication with an access node is determined and compared with load level criteria. When the load amount meets or exceeds the load level criteria, the one or more wireless devices are directed to transmit reference signals using a subband mode of transmission. According to an exemplary embodiment, a subband quality is determined for a plurality of subbands available for the one or more wireless devices and a subband for reference signal transmission is selected from the plurality of subbands based on channel quality criteria. Wireless transmission, such as from an access node, to the one or more wireless devices may be scheduled utilizing beamforming based on the reference signal. According to an exemplary embodiment, when the load amount does not meet the load level criteria, a wideband mode of transmission is used for the reference signals.

Figure 7:
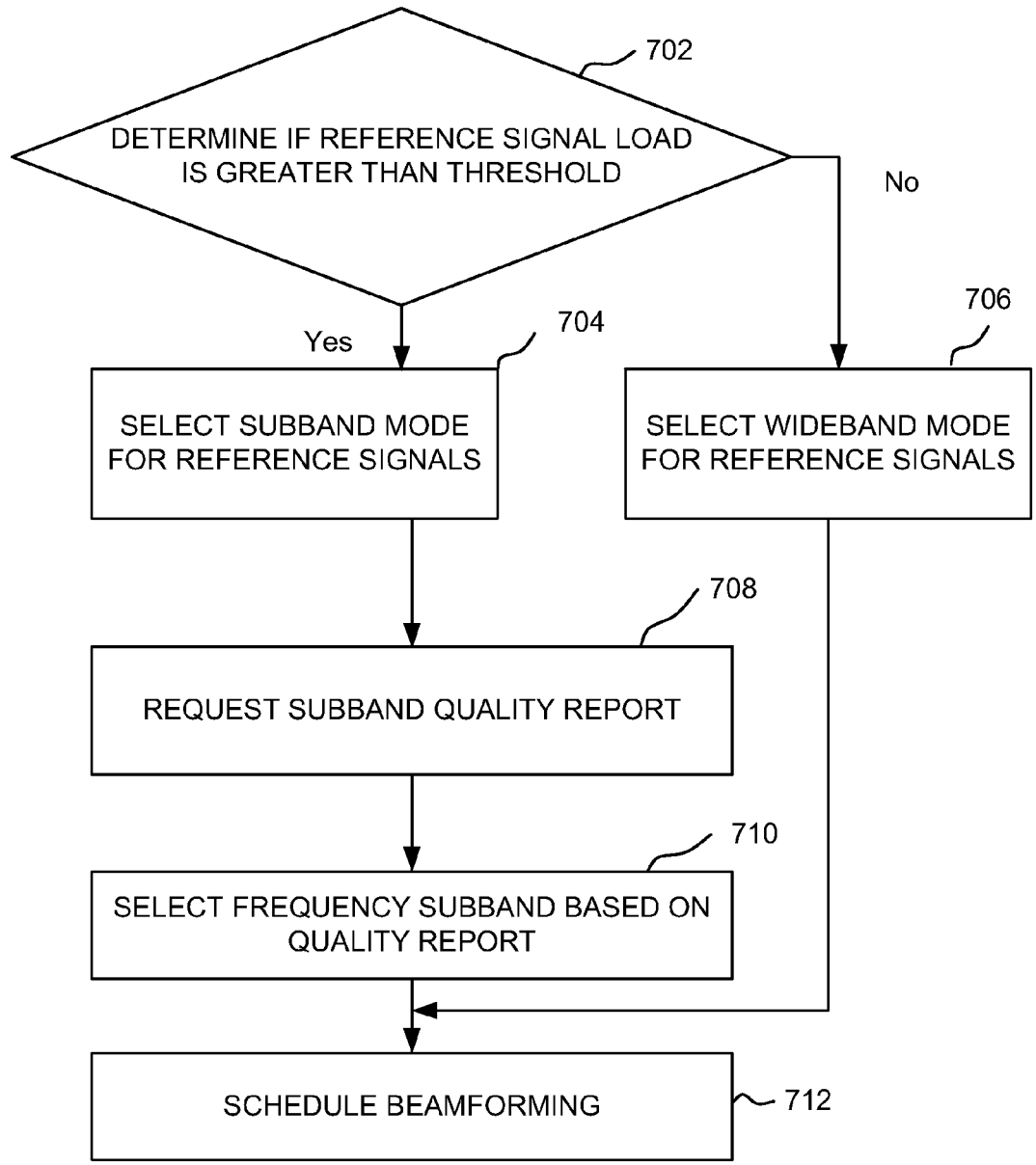
FIG. 7 illustrates an exemplary method of controlling a reference signal transmission mode to facilitate beamforming.

FIG. 7 illustrates a method of controlling a reference signal transmission mode to facilitate beamforming, according to an exemplary embodiment. At step 702, a communication system (e.g., systems 100, 200, 300, 400 of the exemplary embodiments of FIGS. 1-4) determines whether a load amount for reference signals from one or more wireless devices in communication with an access node (e.g., access node 104, 204, 304, 404) of the communication system meets a load level criteria. According to an exemplary embodiment, a processor of the access node is configured to determine whether the load amount meets the load level criteria. According to an exemplary embodiment, when the load amount meets the load level criteria, a subband mode of reference signal transmission is selected in step 704. According to an exemplary embodiment, when the load amount does not meet the load level criteria, a wideband mode of reference signal transmission is selected in step 706.

The load amount for reference signals may depend upon various factors. For example, the number of wireless devices in communication with an access node may affect the load amount. As the number of wireless devices in communication with an access node increases, the reference signal load amount for the access node also increases. In another example, the quality of communication between an access node and a wireless device may affect the load amount. For instance, if a channel used between a wireless device and an access node has low quality, such as due to interference and/or the wireless device being located at a periphery of an access node's transmission range, the wireless device may use additional over the air resources (e.g., physical reference blocks), such as by repeating the transmission of reference signals.

In view of these considerations regarding a reference signal load amount, the various exemplary embodiments described herein contemplate selecting a transmission mode for reference signals by comparing the reference signal load amount to load level criteria. Various measures may be used for load level criteria. According to an exemplary embodiment, load level criteria may be based upon a number of wireless devices in communication with an access node. For example, when the number of wireless devices in communication with an access node meets or exceeds a predetermined number of wireless devices, a subband mode for reference signal transmission is selected (e.g., in step 704 of FIG. 7). When the number of wireless devices in communication with an access node does not meet the predetermined number, a wideband mode for reference signal transmission is selected (e.g., in step 706 of FIG. 7). Mobility of a wireless device (e.g., movement of a wireless device) may be evaluated as load level criteria, according to an exemplary embodiment. For example, as the mobility of a wireless device increases, a reference signal load level may increase, such as due to more frequent reference signal transmissions with the mobility wireless device. Therefore, when the mobility of a wireless device meets or exceeds a predetermined mobility (e.g., rate of movement), and/or a predetermined number of wireless devices meet or exceed a predetermined mobility, a subband mode for reference signal transmission is selected (e.g., in step 704 of FIG. 7), according to an exemplary embodiment.

According to an exemplary embodiment, a time of day may be used as load level criteria. For example, an access node may experience higher load amounts at particular times, such as, for example, during the evening or nighttime. According to an exemplary embodiment, a time period that serves as load level criteria is stored in the non-volatile memory of an access node processor or in a non-volatile memory accessible to the access node processor. When the processor determines that the time of day falls within the time period, the reference signal load amount is determined to meet the load level criteria and a subband mode of reference signal transmission is selected. Conversely, when the time of day falls outside a time period, the reference signal load amount is determined to not meet the load level criteria and a wideband mode of reference signal transmission is selected.

Historical data may be used as load level criteria, according to an exemplary embodiment. For example, historical data for reference signal load amounts may be analyzed to determine time periods during which an access node experiences higher reference signal load amounts and those time periods may be stored as load level criteria in the non-volatile memory of an access node, or stored in a non-volatile memory to the access node. The time period may include, for example, time periods for different days of the week. When the time of day falls within the stored historical time period, the reference signal load amount is determined to meet the load level criteria and a subband mode of reference signal transmission is selected. Conversely, when the time of day falls outside a stored time period, the reference signal load amount is determined to not meet the load level criteria and a wideband mode of reference signal transmission is selected.

The amount of over the air resources used by wireless devices in communication with an access node may be used as load level criteria, according to an exemplary embodiment. Over the air resources may be, for example, physical reference blocks representing a particular frequency subband at a particular time or time period. As discussed above, when the quality of communication between an access node and a wireless device is low, such as due to interference and/or the wireless device being located at a periphery of an access node's transmission range, the wireless device may use additional over the air resources (e.g., physical reference blocks), such as by repeating the transmission of reference signals.

According to an exemplary embodiment, load level criteria may be a predetermined portion or fraction of the total number of over the air resources available for an access node. When the number of over the air resources meets or exceeds the predetermined portion or fraction, the load amount is determined to meet the load level criteria and a subband mode of reference signal transmission is selected. The number of over the air resources used per wireless device may also be used as load level criteria, according to an exemplary embodiment. For example, a predetermined number or range for the number of over the air resources used per wireless device may be stored in electronic memory and when the number of over the air resources used per wireless device meets or exceeds the predetermined number, the load amount is determined to meet the load level criteria.

Other load level criteria may be used to select a reference signal transmission mode. According to an exemplary embodiment, a type of data transmission may be analyzed as load level criteria. For example, when a number of wireless devices using streaming data (e.g., streaming video) exceeds a first predetermined number, the load amount is determined to meet the load level criteria and a subband mode of reference signal transmission is selected. In another example, when a number of wireless devices using text or email data exceeds a second predetermined number, which is greater than the first predetermined number, the load amount is determined to meet the load level criteria.

Once a subband reference signal transmission mode has been selected in step 704, the method of the exemplary embodiment of FIG. 7 may proceed to step 708, at which a subband quality report is requested. For example, a communication system (e.g., systems 100, 200, 300, 400 of the exemplary embodiments of FIGS. 1-4) may analyze the reference signals transmitted via the subband mode or wideband mode to determine channel quality. According to an exemplary embodiment, the communication system may analyze the reference signals and assign channel quality ratings to various channels corresponding to the reference signals according to a channel quality index (e.g., channel quality indicator (CQI)) to facilitate the selection of one of the channels. For example, a channel quality index (e.g., CQI) may be determined by a wireless device based upon measurements of downlink reference signals received by the wireless device. At step 710, the communication system selects a frequency subband to be used for wireless transmissions based upon the subband quality report. For example, a subband having the highest rated quality according to the channel quality index may be selected for the wireless transmissions. At step 712, the communication system schedules wireless transmissions using beamforming from the access node to one or more wireless devices. Beamforming may be accomplished by using weighting derived from the reference signals, as discussed above with regard to the exemplary embodiment of FIG. 3.

Although the methods of the various exemplary embodiments described herein may perform steps in a particular order for purposes of illustration, the methods of the various exemplary embodiments discussed herein are not limited to any particular order or arrangement. One skilled in the art, using the disclosure provided herein, will appreciate that various steps of the methods can be omitted, rearranged, combined, and/or adapted in various ways. For example, steps 708 and 710 in the exemplary embodiment of FIG. 7 need not be performed after determining a load amount and selecting a reference signal transmission mode. According to an exemplary embodiment, obtaining a subband quality report (step 708) and selecting a frequency subband (step 710) may be performed prior to determining a load amount and selecting a reference signal transmission mode (prior to step 702).

Figure 8:
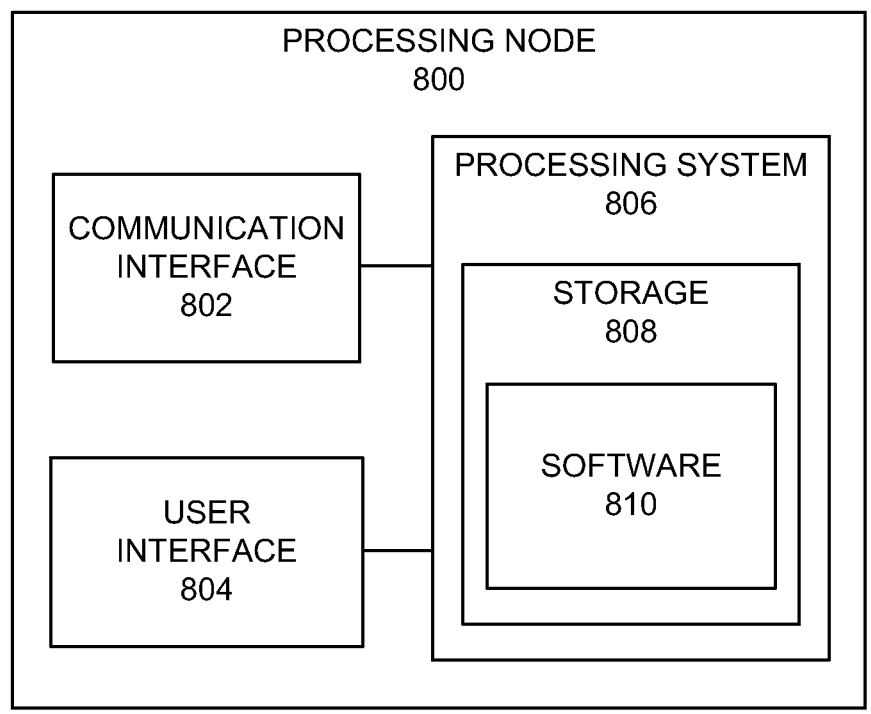
FIG. 8 illustrates an exemplary processing node.

The exemplary embodiment of FIG. 8 illustrates a processing node 800 of a communication system. Processing node 800 comprises communication interface 802, user interface 804, and processing system 806 in communication with communication interface 802 and user interface 804. Processing node 800 can be configured to determine, for example, a communication access node for a wireless device. According to an exemplary embodiment, processing system 806 includes storage 808, which can comprise a disk drive, flash drive, memory circuitry, or other memory device. Storage 808 can store software 810 used in the operation of the processing node 800, according to an exemplary embodiment. Storage 808 may include, for example, a disk drive, flash drive, data storage circuitry, or some other memory apparatus. Software 810 may include, for example, computer programs, firmware, or some other form of machine-readable instructions, including an operating system, utilities, drivers, network interfaces, applications, or some other type of software.

Processing system 806 may include, for example, a microprocessor and other circuitry to retrieve and execute software 810 from storage 808. Processing node 800 may further include other components such as, for example, a power management unit, a control interface unit, etc., which are omitted for clarity. According to an exemplary embodiment, communication interface 802 permits processing node 800 to communicate with other network elements. According to an exemplary embodiment, user interface 804 facilitates the configuration and control of the operation of processing node 800.

Examples of processing node 800 include, for example, controller node 406 and gateway node 408 of the exemplary embodiment of FIG. 4. According to an exemplary embodiment, processing node 800 can be an adjunct or component of a network element, such as an element of access nodes 104, 204, 304, or 404 and the like. Processing node 800 can also be another network element in a communication system, according to an exemplary embodiment. Further, the functionality of processing node 800 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for controlling a reference signal mode to facilitate beamforming, the method comprising:
   determining that a load amount for reference signals from one or more wireless devices in communication with an access node meets a load level criteria;
   determining a subband channel quality for a plurality of subbands available for the one or more wireless devices;
   instructing the access node, based on the determination that the load amount meets the load level criteria, to direct the one or more wireless devices to transmit reference signals using a subband selected from the plurality of subbands, wherein the subband is selected from the plurality of subbands based on a higher channel quality relative to other subbands within the plurality of subbands;
   instructing the access node to schedule wireless transmissions to the one or more wireless utilizing beamforming based upon the reference signals;
   determining that the load amount does not meet the load level criteria; and
   instructing the access node, based on the determination that the load amount does not meet the load level criteria, to direct the one or more wireless devices to transmit reference signals using a wideband mode of transmission.

2. The method of claim 1, wherein the load amount is determined based upon a number of the one or more wireless devices in a range of the access node.

3. The method of claim 1, wherein the load amount is determined based upon historical usage data for the access node.

4. The method of claim 1, wherein the load amount is determined based upon a time of day.

5. The method of claim 1, wherein the determining of the subband channel quality comprises assigning a channel quality value to the plurality of subbands available for the one or more wireless devices.

6. The method of claim 1, wherein the directing the one or more wireless devices to transmit reference signals comprises directing the one or more wireless devices to transmit using a group of subbands that collectively correspond to a transmission band available to the access node.

7. The method of claim 1, wherein the directing the one or more wireless devices to transmit reference signals comprises directing the one or more wireless devices to transmit using subbands previously selected from amongst the plurality of subbands.

8. The method of claim 1, wherein the instructing the access node to schedule wireless transmissions comprises scheduling wireless transmission using time division duplexing.

9. The method of claim 1, wherein the instructing the access node to schedule the wireless transmissions comprises beamforming using weighting determined using the reference signals.

10. A system for controlling a reference signal mode to facilitate beamforming, the system comprising:
    a processing node comprising a processor configured to:
        determine that a load amount for reference signals from one or more wireless devices in communication with an access node meets a load level criteria;
        determine a subband channel quality for a plurality of subbands available for the one or more wireless devices;
        instruct the access node, based on the determination that the load amount meets the load level criteria, to direct the one or more wireless devices to transmit reference signals using a subband selected from the plurality of subbands, wherein the subband is selected from the plurality of subbands based on a higher channel quality relative to other subbands within the plurality of subbands;
        instruct the access node to schedule wireless transmissions to the one or more wireless utilizing beamforming based upon the reference signals;
        determine that the load amount does not meet the load level criteria; and
        instruct the access node, based on the determination that the load amount does not meet the load level criteria, to direct the one or more wireless devices to transmit reference signals using a wideband mode of transmission.

11. The system of claim 10, wherein the processor is configured to determine the load amount based upon a number of the one or more wireless devices in a range of the access node.

12. The system of claim 10, wherein the processor is configured to determine the load amount based upon historical usage data for the access node.

13. The system of claim 10, wherein the processor is configured to determine the load amount based upon a time of day.

14. The system of claim 10, wherein the processor is configured to determine the subband channel quality by assigning a channel quality value to the plurality of subbands available for the one or more wireless devices.

15. The system of claim 10, wherein the processor is configured to direct the one or more wireless devices to transmit the reference signals using a group of subbands that collectively correspond to a transmission band available to the access node.

16. The system of claim 10, wherein the processor is configured to direct the one or more wireless devices to transmit the reference signals by selecting subbands previously selected from amongst the plurality of subbands.

17. The system of claim 10, wherein the processor is configured to instruct the access node to schedule the wireless transmissions using time division duplexing.

18. The system of claim 10, wherein the process is configured to instruct the access node to schedule the wireless transmissions comprising beamforming using weighting determined using the reference signals.

* * * * *